(12) United States Patent
Park et al.

(10) Patent No.: US 9,264,844 B2
(45) Date of Patent: *Feb. 16, 2016

(54) METHOD AND APPARATUS OF PROVIDING SIM PROFILE FOR EMBEDDED UNIVERSAL INTEGRATED CIRCUIT CARD

(71) Applicant: KT CORPORATION, Seongnam-si (KR)

(72) Inventors: Chul Hyun Park, Seoul (KR); Kwan Lae Kim, Seoul (KR); Joo Young Kim, Seoul (KR); Jin Hyoung Lee, Seoul (KR); Hyung Jin Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 58 days.

This patent is subject to a terminal disclaimer.

(21) Appl. No.: 13/901,039

(22) Filed: May 23, 2013

(65) Prior Publication Data

US 2014/0045460 A1 Feb. 13, 2014

(30) Foreign Application Priority Data

May 24, 2012 (KR) ......................... 10-2012-0055614
May 22, 2013 (KR) ......................... 10-2013-0057566

(51) Int. Cl.
*H04M 3/16* (2006.01)
*H04W 4/00* (2009.01)
*H04W 8/20* (2009.01)

(52) U.S. Cl.
CPC .............. *H04W 4/003* (2013.01); *H04W 8/205* (2013.01)

(58) Field of Classification Search
CPC ..... H04W 4/003; H04W 8/183; H04W 12/06; H04W 4/001; H04W 4/06; H04W 12/04; H04W 8/205
USPC ......... 455/411, 410, 418, 422.1, 432.1, 432.3
See application file for complete search history.

(56) References Cited

U.S. PATENT DOCUMENTS

| | | | |
|---|---|---|---|
| 8,996,002 B2 * | 3/2015 | Rodgers ............... | H04W 8/183 370/310 |
| 2010/0306837 A1 * | 12/2010 | Ueno et al. ......................... | 726/7 |
| 2011/0306318 A1 | 12/2011 | Rodgers et al. | |
| 2012/0108204 A1 * | 5/2012 | Schell et al. ................... | 455/411 |
| 2012/0108205 A1 * | 5/2012 | Schell et al. ................... | 455/411 |
| 2012/0108206 A1 * | 5/2012 | Haggerty ...................... | 455/411 |
| 2012/0108207 A1 * | 5/2012 | Schell et al. ................... | 455/411 |
| 2012/0108295 A1 * | 5/2012 | Schell et al. ................... | 455/558 |
| 2012/0115441 A1 * | 5/2012 | Schell ............................ | 455/411 |
| 2012/0117635 A1 * | 5/2012 | Schell ..................... | G06F 21/34 726/9 |
| 2012/0172016 A1 * | 7/2012 | Veneroso .............. | H04W 12/06 455/414.1 |
| 2012/0190354 A1 * | 7/2012 | Merrien et al. ............ | 455/422.1 |
| 2013/0023309 A1 * | 1/2013 | Holtmanns et al. ........... | 455/558 |
| 2013/0157673 A1 * | 6/2013 | Brusilovsky .......... | H04W 8/265 455/450 |
| 2013/0231087 A1 * | 9/2013 | O'Leary ....................... | 455/411 |
| 2014/0031012 A1 * | 1/2014 | Park et al. ..................... | 455/411 |
| 2014/0099916 A1 * | 4/2014 | Mallikarjunan et al. ...... | 455/406 |

* cited by examiner

*Primary Examiner* — Mong-Thuy Tran
(74) *Attorney, Agent, or Firm* — Sughrue Mion, PLLC

(57) ABSTRACT

There are provided a method of providing a SIM profile to an eUICC device online and a device using the same. The method of providing the SIM profile includes purchasing the SIM profile provided in an app store using a user device capable of accessing the app store, downloading the purchased SIM profile in the eUICC device using the eUICC device capable of accessing the app store, and installing the SIM profile, that is downloaded in the eUICC device, in the eUICC device therein. Therefore, it is possible to purchase the SIM profile using the online app store that is operated in a variety of forms and easily install the purchased SIM profile in the eUICC device.

10 Claims, 2 Drawing Sheets

METHOD AND APPARATUS OF PROVIDING SIM PROFILE FOR EMBEDDED UNIVERSAL INTEGRATED CIRCUIT CARD

CLAIM FOR PRIORITY

This application claims priority to Korean Patent Application No. 10-2012-0055614 filed on May 24, 2012, and No. 10-2013-0057566 filed on May 22, 2013, in the Korean Intellectual Property Office (KIPO), the entire contents of which are hereby incorporated by reference.

BACKGROUND

1. Technical Field

Example embodiments of the present invention relate to an environment that uses an eUICC, and more specifically, to a method and device for providing a SIM profile to an eUICC online

2. Related Art

A universal integrated circuit card (UICC) is a smart card that is inserted into a terminal and used as a module for user authentication. The UICC may store a user's personal information and carrier information about a mobile carrier to which the user subscribes. For example, the UICC may include an international mobile subscriber identity (IMSI) to identify the user.

The UICC is called as a subscriber identity module (SIM) card in a global system for mobile communications (GSM) method, and a universal subscriber identity module (USIM) card in a wideband code division multiple access (WCDMA) method.

When the user installs the UICC in the user's terminal, user authentication is automatically performed using information stored in the UICC so that the user may conveniently use the terminal. When the user replaces the terminal, the user may detach the UICC from the old terminal and reinstall it in a new terminal, to easily replace the terminal.

Meanwhile, it is difficult to downsize a terminal which requires a compact size, for example, a terminal for machine-to-machine (M2M) communication, when the terminal is manufactured to have a detachable UICC. Therefore, an embedded UICC (eUICC) structure that is a non-detachable UICC has been proposed.

Since an existing UICC is detachable from the terminal, the user may activate the terminal regardless of a type of the terminal or a mobile carrier. However, a UICC that is embedded when a terminal is manufactured may include an international mobile subscriber identity (IMSI) in the eUICC when it is assumed that the UICC is used for only a specific mobile carrier. In order to, for example, order, activate, and terminate the terminal, the eUICC needs to get information (for example, an IMSI) on a user of the corresponding UICC through, for example, downloading.

In the eUICC that is integrally installed in the terminal, the UICC is installed in the terminal when the terminal is manufactured and released, unlike the existing detachable UICC. Due to its non-detachable physical structure, it is necessary to remotely download from an external location and install in the eUICC a network operator authentication key (K), a UICC data file (a network access file, an international mobile subscriber identity (IMSI), a home public land mobile network (HPLMN), etc.), a user information file (for example, a short message service (SMS) file, a phonebook, etc.), and an applet, etc.

That is, the eUICC device having the UICC embedded in the terminal when the terminal is released needs to remotely manage SIM profile information due to its non-separable physical characteristics of the UICC from the terminal.

SUMMARY

Accordingly, example embodiments of the present invention are provided to substantially obviate one or more problems due to limitations and disadvantages of the related art.

Example embodiments of the present invention provide a method of easily delivering a SIM profile to an eUICC device via a network.

Example embodiments of the present invention also provide the eUICC device that is able to easily receive the SIM profile via the network.

In some example embodiments, a method of providing a SIM profile includes purchasing the SIM profile provided in an app store using a user device capable of accessing the app store, downloading the purchased SIM profile in an eUICC device using the eUICC device capable of accessing the app store, and installing the SIM profile, that is downloaded in the eUICC device, in the eUICC device therein.

The SIM profile may be purchased in a form of an application from the app store and may be downloaded in the eUICC device.

In the purchasing of the SIM profile, a user interface for purchasing the application in the app store may be provided to the user device that is accessed the app store.

In the purchasing of the SIM profile, the SIM profile may be purchased by accessing the user device to the app store based on credentials of a user who uses the user device capable of accessing the app store.

In the purchasing of the SIM profile, purchasing information on the SIM profile purchased in the app store may be displayed in the app store.

In the downloading of the purchased SIM profile in the eUICC device, the purchased SIM profile may be downloaded from the app store to the eUICC device based on the credentials of the user and purchasing information on the SIM profile.

In the installing of the SIM profile in the eUICC device, an initial SIM profile installed in the eUICC device may be replaced with the SIM profile downloaded in the eUICC device.

The method of providing the SIM profile further includes requesting authentication of the eUICC device by accessing an operator server based on the SIM profile installed in the eUICC device.

In other example embodiments, an eUICC device includes a network connection unit configured to access an app store via a network, a SIM profile installation unit configured to download a SIM profile purchased in the app store using a user device capable of accessing the app store through the network connection unit and install the profile, and an authentication unit configured to perform authentication by accessing an operator server based on information on the SIM profile.

The SIM profile may be purchased in a form of an application in the app store and may be downloaded in the eUICC device.

The network connection unit may access the app store based on credentials of a user who uses a user device capable of accessing the app store.

The SIM profile installation unit may download the purchased SIM profile from the app store based on the credentials of the user and purchasing information on the SIM profile purchased in the app store.

The SIM profile installation unit may replace an initial SIM profile installed in the eUICC device with the SIM profile downloaded in the eUICC device.

The authentication unit may request authentication of the eUICC device by accessing the operator server based on the SIM profile installed in the eUICC device.

When the method of providing the SIM profile and the eUICC according to the embodiments of the invention are used, it is possible to purchase the SIM profile using the online app store that is operated in a variety of forms. Particularly, it is possible to purchase the SIM profile in advance using another user device other than the eUICC device and easily install the purchased SIM profile in the eUICC device.

Moreover, it is possible to easily manage the history of the SIM profile used by each user based on the SIM profile purchasing history per user using the app store providing the SIM profile.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
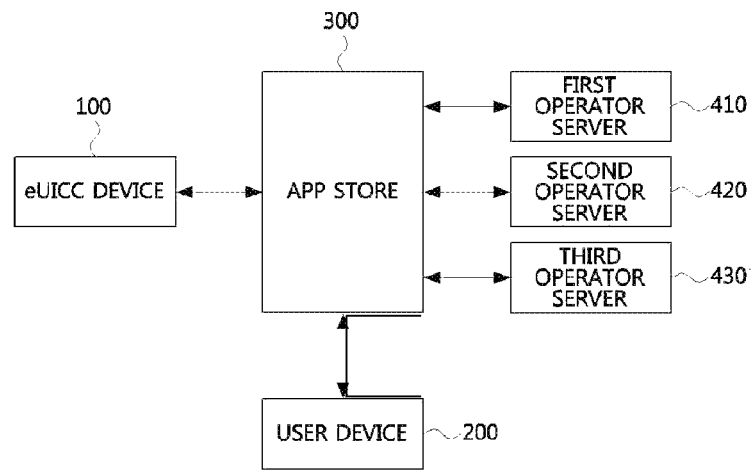
FIG. 1 is a conceptual diagram illustrating a method of providing a SIM profile according to an embodiment of the invention.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

First, terminology used in this application will be briefly described below.

An app store is an abbreviated word of an application store and refers to an online mobile content (software) market that can freely buy and sell a mobile application (a content application installed in a cellular phone, for example, a scheduler, an address book, an alarm, a calculator, a game, a video, Internet access, a music player, a navigator, Word, and Excel), and may be usually considered as an online application market that can be mounted on a smartphone. The app store may include, for example, a Google's Android app store, online app stores of mobile network operators, and a wholesale app community (WAC) that is a kind of an app wholesale market in which major carriers and manufactures are participated.

An operator refers to a mobile network operator (MNO), and an operator server may refer to a server that is operated by the operator and provides a service to a subscriber.

A subscriber identification module (SIM) refers to a subscriber identification module, is an essential element of a global system for mobile communications (GSM) terminal, and may be usually implemented in a form of an integrated circuit (IC) card. Moreover, the SIM profile refers to a specific group (set) of information parameter values included in the SIM.

Hereinafter, exemplary embodiments of the invention will be described in detail with reference to the accompanying drawings.

Figure 2:
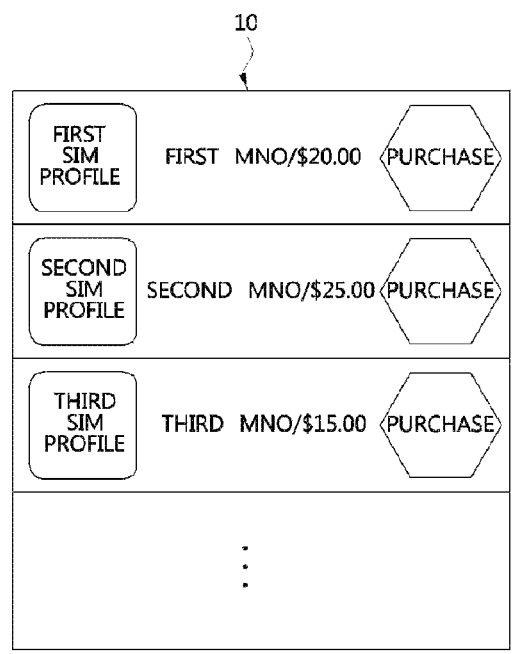
FIG. 2 is a diagram illustrating an example of a user interface of an app store that provides the SIM profile according to the embodiment of the invention.

FIG. 1 is a conceptual diagram illustrating a method of providing the SIM profile according to the embodiment of the invention. FIG. 2 is a diagram illustrating an example of a user interface 10 of an app store 300 that provides the SIM profile according to the embodiment of the invention.

As illustrated in FIG. 1, the method of providing the SIM profile according to the embodiment of the invention may be implemented by exchanging information among an eUICC device 100, a user device 200, the app store 300, and an operator server 400.

The eUICC device 100 may refer to a device having a non-detachable embedded UICC (eUICC). For example, the eUICC device 100 may refer to a terminal for machine-to-machine (M2M) communication. However, a type of the eUICC device 100 is not specifically limited in the invention.

The user device 200 is a device capable of purchasing the SIM profile by accessing the app store 300 and may refer to a variety of user terminals. For example, the user device 200 may refer to a device, for example, a smartphone, a lab top, and a tablet PC, that can access the app store 300 via a network. Therefore, the user device 200 may provide the user interface 10 for purchasing the application in the app store 300 to a user.

First, the operator may upload the SIM profile to the app store 300 using the operator server 400. In this case, the SIM profile may be uploaded to or registered in the app store 300 in a form of an application. That is, a plurality of operators upload or register the SIM profile for communication service activation in the app store 300 and distribute the SIM profile to a plurality of users.

The user uses the user device 200 capable of accessing the app store 300 via the network and may purchase the SIM profile in the app store 300.

As illustrated in FIG. 2, the user device 200 may display the user interface 10 provided in the app store 300 and the user may purchase the SIM profile in the app store 300 using the user device 200.

The user device 200 may display a list of SIM profiles provided by the plurality of operators.

For example, a first SIM profile provided by a first operator server 410, a second SIM profile provided by a second operator server 420, and a third SIM profile provided by a third operator server 430 may be displayed in the user interface 10, and a purchasing icon for selecting and purchasing a desired SIM profile may be displayed in the user interface 10.

Moreover, the user interface 10 may display sales information on a corresponding SIM profile in addition to the SIM profile. In this case, the sales information on the SIM profile may include, for example, information on the operator who provides the corresponding SIM profile and purchase prices.

The user may access the app store 300 using the eUICC device 100, download the purchased SIM profile in the eUICC device 100 using the user device 200, and install the profile.

Therefore, the eUICC device 100 may download the SIM profile purchased in the app store 300 using the user device 200 other than the eUICC device, and use the profile. Therefore, it is possible to activate communication service with respect to a new operator.

Figure 3:
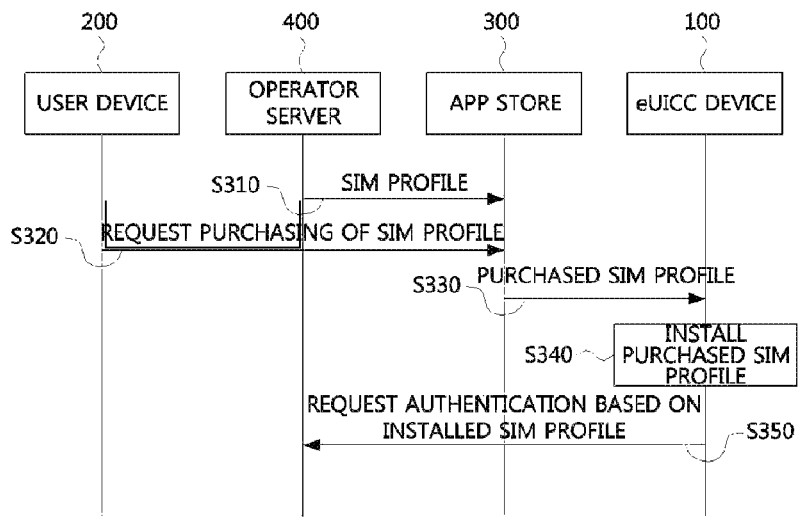
FIG. 3 is a flowchart illustrating a method of providing the SIM profile according to the embodiment of the invention.

FIG. 3 is a flowchart illustrating a method of providing the SIM profile according to the embodiment of the invention.

As illustrated in FIG. 3, the method of providing the SIM profile according to the embodiment of the invention may include purchasing the SIM profile, downloading the purchased SIM profile to the eUICC device 100, and installing the downloaded SIM profile to the eUICC device 100.

First, the operator may upload and register the SIM profile to the app store 300 through the operator server 400 (S310). That is, the app store 300 may receive the SIM profiles provided by the plurality of operators and provide the profiles to the user. In this case, the SIM profile may be provided in a form of an application.

The user may select and purchase a necessary SIM profile among the SIM profiles provided by the plurality of operators by accessing the app store 300 using the user device 200. That is, the user may request purchasing of the SIM profile from app store 300 using the user device 200 (S320).

The user interface 10 for purchasing the application in the app store 300 may be provided to the user device 200 that is connected to the app store 300. Specifically, based on credentials of the user who uses the user device 200 capable of accessing the app store 300, it is possible to purchase the SIM profile by accessing the user device 200 to the app store 300. In this case, the user credentials may refer to a user's unique information, for example, an ID and a password, that can identify the user.

For example, it is possible to purchase the SIM profile to be used in the eUICC device 100 using the user interface 10 provided by the app store 300 that corresponds to characteristics of the user device 200. Moreover, it is possible to freely obtain the SIM profile according to a SIM profile policy of the operator.

When the SIM profile is purchased using the user device 200, purchasing information on the SIM profile may be displayed in the user interface 10 provided by the app store 300. For example, the app store 300 may store the purchasing information on the SIM profile per user as a virtual purchasing item.

The user may download the purchased SIM profile in the eUICC device 100 using the eUICC device 100 capable of accessing the app store 300 (S330). For example, based on the credentials of the user and the purchasing information on the SIM profile, it is possible to download the purchased SIM profile from the app store 300 to the eUICC device 100.

The SIM profile downloaded in the eUICC device 100 may be installed in the eUICC device 100 (S340). An initial SIM profile installed in the eUICC device 100 may be replaced with the SIM profile downloaded in the eUICC device 100. That is, the SIM profile installed in the eUICC device 100 may be replaced with a new SIM profile purchased in the app store 300. For example, the SIM profile downloaded in a form of an application is executed, installed in the eUICC device 100, and activated through a process of, for example, rebooting of the eUICC device 100.

Meanwhile, in the method of providing the SIM profile according to the embodiment of the invention, it is possible to access the operator server 400 based on the SIM profile installed in the eUICC device 100 and request authentication of the eUICC device 100 (S350). That is, the eUICC device 100 may access the corresponding operator server 400 and request authentication using user information and the operator information for operator authentication included in the SIM profile installed in the eUICC device 100.

Figure 4:
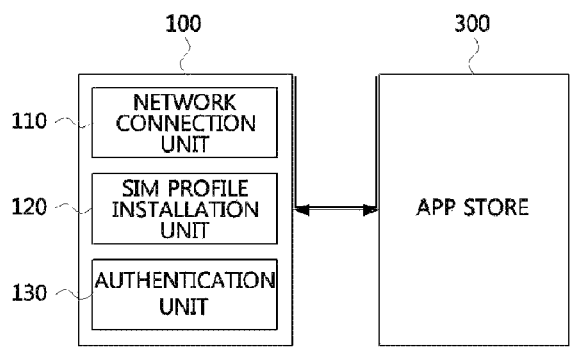
FIG. 4 is a block diagram illustrating operations of an eUICC device according to the embodiment of the invention.

FIG. 4 is a block diagram illustrating operations of the eUICC device according to the embodiment of the invention.

As illustrated in FIG. 4, the eUICC device 100 according to the embodiment of the invention includes a network connection unit 110, a SIM profile installation unit 120, and an authentication unit 130.

The network connection unit 110 may access the app store 300 via the network. That is, the network connection unit 110 may access the app store 300 via a wired or wireless network. For example, the network connection unit 110 may access the app store 300 via a local network such as WiFi or a hotspot.

Moreover, the network connection unit 110 may access the app store 300 based on the credentials of the user who uses the user device 200 capable of accessing the app store 300. In this case, the user credentials may refer to a user's unique information, for example, an ID and a password, that can identify the user.

The SIM profile installation unit 120 may download the SIM profile, that is purchased in the app store 300 using the user device 200 capable of accessing the app store 300, through the network connection unit 110 and install the profile. For example, the SIM profile installation unit 120 may provide the user interface for selecting and downloading the SIM profile purchased in the app store 300. It is possible to download the purchased SIM profile selected using this user interface to the eUICC device 100.

Specifically, the SIM profile installation unit 120 may download the purchased SIM profile from the app store 300 based on the user credentials and the purchasing information on the SIM profile purchased in the app store 300.

Further, the purchasing information on the purchased SIM profile and the user credentials may be mapped to each other and managed in the app store 300. Therefore, it is possible for the app store 300 to manage a history of the SIM profile used by each user and the history can be used for user marketing. That is, the app store 300 may provide a service, for example, advertisement sending, operator recommendation, and plan recommendation, using the purchasing history of the SIM profile.

Moreover, the SIM profile installation unit 120 may execute the SIM profile downloaded in a form of an application and install the profile in the eUICC device 100. For example, the SIM profile installation unit 120 may replace the initial SIM profile installed in the eUICC device 100 with the SIM profile downloaded in the eUICC device 100. That is, the SIM profile installation unit 120 may replace the SIM profile installed in the eUICC device 100 with a new SIM profile purchased in the app store 300.

The authentication unit 130 may access the operator server 400 based on information on the SIM profile and perform authentication. That is, the authentication unit 130 may access the operator server 400 based on the SIM profile installed in the eUICC device 100 and request authentication of the eUICC device 100. Specifically, the authentication unit 130 may access the corresponding operator server 400 and request authentication using the user information and the operator information for operator authentication included in the SIM profile installed in the eUICC device 100.

The eUICC device 100 according to the embodiment of the invention may be used to implement the method of providing the SIM profile described above.

Moreover, while each configuration unit of the eUICC device 100 according to the embodiment of the invention is listed and described by a respective configuration unit for convenience of descriptions, at least two units among configuration units may be combined in one configuration unit, or one configuration unit may be split into several configuration units to perform functions. Such integrated and separated embodiments of each of the configuration units fall within the scope of the invention without departing from the spirit of the invention.

When the method of providing the SIM profile and the eUICC device according to the embodiments of the invention are used, it is possible to purchase the SIM profile using the online app store 300 that is operated in a variety of forms. Particularly, it is possible to purchase the SIM profile in advance using another user device 200 other than the eUICC device 100 and easily install the purchased SIM profile in the eUICC device 100.

Moreover, the app store 300 providing the SIM profile may easily manage the history of the SIM profile used by each user based on the SIM profile purchasing history per user.

While the example embodiments of the present invention and their advantages have been described in detail, it should be understood that various changes, substitutions and alterations may be made herein without departing from the scope of the invention as defined by the following claims.

What is claimed is:

1. A method of providing a subscriber identity module (SIM) profile, comprising:
   purchasing the SIM profile provided in an app store using a user device capable of accessing the app store;
   downloading the purchased SIM profile in an embedded universal integrated circuit (eUICC) device using the eUICC device capable of accessing the app store; and
   installing the SIM profile, that is downloaded in the eUICC device, in the eUICC device therein,
   wherein in the purchasing of the SIM profile, a user interface for purchasing the application in the app store is provided to the user device that accesses the app store, and the SIM profile is purchased by the user device accessing the app store based on credentials of a user who uses the user device,
   wherein in the downloading of the purchased SIM profile in the eUICC device, the purchased SIM profile is downloaded from the app store to the eUICC device based on the credentials of the user and purchasing information related to the SIM profile, and
   wherein the user device is separate from the eUICC device.

2. The method of claim 1, wherein the SIM profile is purchased in a form of an application from the app store and is downloaded in the eUICC device.

3. The method of claim 1, wherein in the purchasing of the SIM profile, purchasing information on the SIM profile purchased in the app store is displayed in the app store.

4. The method of claim 1, wherein in the installing of the SIM profile in the eUICC device, an initial SIM profile installed in the eUICC device is replaced with the SIM profile downloaded in the eUICC device.

5. The method of claim 1, further comprising:
   requesting authentication of the eUICC device by accessing an operator server based on the SIM profile installed in the eUICC device.

6. An embedded universal integrated circuit (eUICC) device comprising:
   a network connection unit configured to access an app store via a network;
   a subscriber identity module (SIM) profile installation unit configured to download a SIM profile purchased in the app store using a user device capable of accessing the app store through the network connection unit and install the profile; and
   an authentication unit configured to perform authentication by accessing an operator server based on information on the SIM profile,
   wherein the SIM profile is purchased in a form of an application in the app store by the user device accessing the app store based on credentials of a user who uses the user device,
   wherein the purchased SIM profile is downloaded from the app store to the eUICC device based on the credentials of the user and purchasing information related to the SIM profile, and
   wherein the user device is separate from the eUICC device.

7. The device of claim 6, wherein the network connection unit accesses the app store based on credentials of a user who uses the user device capable of accessing the app store.

8. The device of claim 7, wherein the SIM profile installation unit downloads the purchased SIM profile from the app store based on the credentials of the user and purchasing information related to the SIM profile purchased in the app store.

9. The device of claim 8, wherein the SIM profile installation unit replaces an initial SIM profile installed in the eUICC device with the SIM profile downloaded in the eUICC device.

10. The device of claim 6, wherein the authentication unit requests authentication of the eUICC device by accessing the operator server based on the SIM profile installed in the eUICC device.

* * * * *